United States Patent
Schmitt et al.

(10) Patent No.: US 11,099,261 B2
(45) Date of Patent: Aug. 24, 2021

(54) SCANNING DEVICE

(71) Applicant: Robert Bosch GmbH, Stuttgart (DE)

(72) Inventors: Stephen Schmitt, Nuertingen (DE); Siegwart Bogatscher, Sersheim (DE); Ulrike Schloeder, Reutlingen (DE); Stefan Mark, Wuerzburg (DE); Thorsten Balslink, Kirchentellinsfurt (DE); Hans-Jochen Schwarz, Stuttgart (DE); Jan Sparbert, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 448 days.

(21) Appl. No.: 16/060,797

(22) PCT Filed: Nov. 9, 2016

(86) PCT No.: PCT/EP2016/077048
§ 371 (c)(1),
(2) Date: Jun. 8, 2018

(87) PCT Pub. No.: WO2017/114607
PCT Pub. Date: Jul. 6, 2017

(65) Prior Publication Data
US 2018/0364335 A1 Dec. 20, 2018

(30) Foreign Application Priority Data
Dec. 29, 2015 (DE) ..................... 10 2015 226 773.3

(51) Int. Cl.
*G01S 7/48* (2006.01)
*G01S 7/481* (2006.01)
*G01S 17/02* (2020.01)

(52) U.S. Cl.
CPC ............ *G01S 7/4817* (2013.01); *G01S 17/02* (2013.01)

(58) Field of Classification Search
CPC .................................. G01S 7/4817; G01S 17/02
See application file for complete search history.

(56) References Cited

U.S. PATENT DOCUMENTS

2005/0150734 A1* 7/2005 Breier ...................... B60K 6/26
    192/3.21
2010/0103019 A1* 4/2010 Ammar ................... G01S 17/89
    342/22

(Continued)

FOREIGN PATENT DOCUMENTS

DE     10 2006 006 962 A1     8/2007

OTHER PUBLICATIONS

International Search Report corresponding to PCT Application No. PCT/EP2016/077048, dated Feb. 22, 2017 (German and English language document) (7 pages).

(Continued)

*Primary Examiner* — Luke D Ratcliffe
(74) *Attorney, Agent, or Firm* — Maginot, Moore & Beck LLP

(57) ABSTRACT

A scanning device includes a transmitter, a receiver, and a rotor that is configured to be mounted in a rotatable manner about an axis of rotation. The transmitter is configured to at least occasionally emit electromagnetic radiation, and the receiver is configured to sense at least part of the electromagnetic radiation reflected and/or scattered by an object. The transmitter and the receiver are arranged on the rotor in an at least partially axially overlapping manner based on the axis of rotation.

18 Claims, 4 Drawing Sheets

(56) References Cited

U.S. PATENT DOCUMENTS

| | | | |
|---|---|---|---|
| 2010/0265117 A1* | 10/2010 | Weiss | G01S 13/003 342/22 |
| 2011/0175765 A1* | 7/2011 | Chekroun | G01S 7/41 342/22 |
| 2013/0088872 A1* | 4/2013 | Ball | G01S 17/89 362/249.01 |

OTHER PUBLICATIONS

Pieraccini et al.; SAR imagery by RotoSAR; 2015 IEEE International Conference on Microwaves, Communication, Antennas and Electronic Systems; Nov. 2-4, 2015; 5 Pages.

* cited by examiner

SCANNING DEVICE

This application is a 35 U.S.C. § 371 National Stage Application of PCT/EP2016/077048, filed on Nov. 9, 2016, which claims the benefit of priority to Serial No. DE 10 2015 226 773.3, filed on Dec. 29, 2015 in Germany, the disclosures of which are incorporated herein by reference in their entirety.

BACKGROUND

The disclosure relates to a scanning device.

A scanning device is known that exhibits a transmitter, a receiver and a drive motor, the transmitter, the receiver and the drive motor being arranged offset in relation to one another in the axial direction with respect to a common rotation axis.

It is an object of the disclosure to make a scanning device available that is particularly compact in the axial direction.

SUMMARY

This configuration is achieved by means of a scanning device according to the disclosure. Advantageous embodiments are specified in the dependent claims.

In accordance with the disclosure, it has been recognized that an improved scanning device can be made available by virtue of the fact that the scanning device exhibits a transmitter, a receiver and a rotor. The rotor can be supported so as to be capable of rotating about a rotation axis. The transmitter is designed to emit electromagnetic radiation at least intermittently. The receiver is designed to capture at least a fraction of the electromagnetic radiation reflected and/or scattered by an object. The transmitter and the receiver are arranged on the rotor. The transmitter and the receiver are arranged in at least partly axially overlapping manner with respect to the rotation axis. As a result, a configuration of the scanning device can be guaranteed that is particularly compact and slim in the axial direction.

In a further embodiment, the scanning device exhibits a drive motor. The drive motor includes at least one means for generating a torque. The means is arranged in at least partly axially overlapping manner in relation to the transmitter and/or in relation to the receiver. As a result, the scanning device can be designed to be particularly slim in the axial direction.

In a further embodiment, the transmitter, the receiver and the means are arranged together on the rotor. As a result, a number of components of the scanning device can be kept particularly low.

In a further embodiment, the drive motor exhibits a stator. The stator is arranged in at least partly axially overlapping manner in relation to the transmitter and/or in relation to the receiver. The stator is preferentially arranged, at least in some sections, radially between the means and the transmitter and/or receiver.

In a further embodiment, the means is arranged in supported manner so as to be capable of rotating about a further rotation axis. The rotor is coupled with the means in torque-locked manner by means of a torque-locked connection. As a result, the scanning device can be optimally adapted to an existing construction space.

In a further embodiment, the torque-locked connection exhibits a first tooth system, coupled with the means, and a second tooth system, coupled with the rotor, the first tooth system engaging with the second tooth system in meshing manner. Additionally or alternatively, the torque-locked connection exhibits at least one first disk, coupled with the means in torque-locked manner, and a second disk, coupled with the rotor in torque-locked manner, and a coupling means, the first disk being coupled by means of the coupling means, in particular a chain or a belt, with the second disk for the transmission of torque between the rotor and the means. Additionally or alternatively, the torque-locked connection exhibits an impeller, coupled with the means, and a turbine wheel, coupled with the rotor, the impeller being coupled fluid-dynamically, in particular gas-dynamically and/or hydrodynamically, with the impeller. Additionally or alternatively, the torque-locked connection couples the rotor with the means inductively.

In a further embodiment, the rotation axis and the further rotation axis are arranged parallel to one another.

In a further embodiment, the means is arranged radially outside or radially inside in relation to the transmitter and/or in relation to the receiver with respect to the rotation axis.

In a further embodiment, the transmitter is arranged radially offset in relation to the receiver and radially offset in relation to the means with respect to the rotation axis. The transmitter is preferentially arranged radially inside or radially outside in relation to the receiver with respect to the rotation axis. Additionally or alternatively, the transmitter is arranged offset in the circumferential direction in relation to the receiver with respect to the rotation axis. The transmitter and the receiver are preferentially arranged radially on a common circular path about the rotation axis.

In a further embodiment, the means comprises at least one coil and/or a permanent magnet and/or an arrangement of coils and/or an arrangement of permanent magnets.

BRIEF DESCRIPTION OF THE DRAWINGS

The disclosure will be elucidated in more detail below on the basis of figures. Shown in these figures are:

The invention will be elucidated in more detail below on the basis of figures. Shown in these figures are:

FIG. 1 shows a longitudinal section through a scanning device 10 according to a first embodiment.

DETAILED DESCRIPTION

Figure 1:
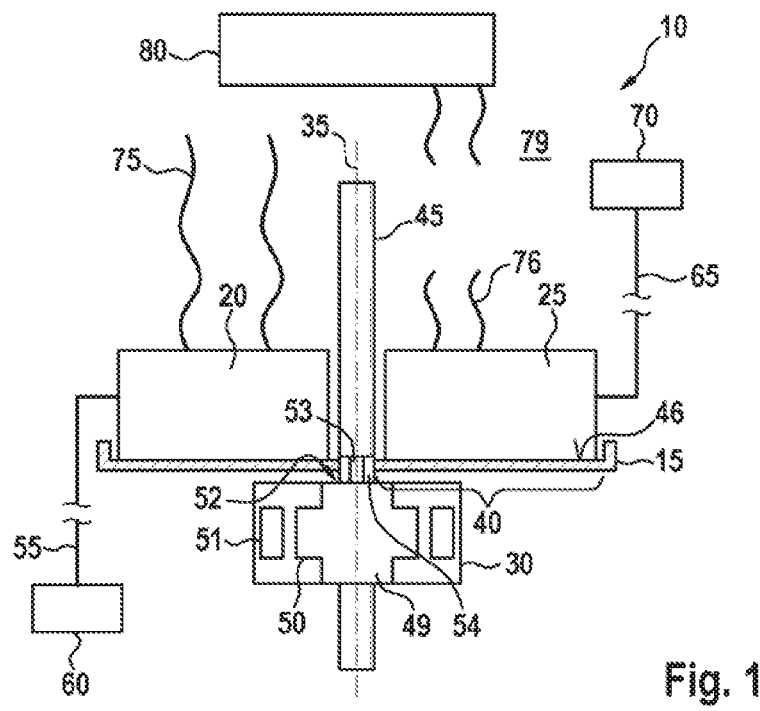
FIG. 1: a longitudinal section through a scanning device according to a first embodiment.

The scanning device 10 exhibits a rotor 15, a transmitter 20, a receiver 25 and a drive motor 30. The rotor 15 is rotatably supported so as to be capable of rotating about a rotation axis 35.

The rotor 15 exhibits a disk portion 40 and preferentially a shaft portion 45. The shaft portion 45 is connected to the disk portion 40 in torque-locked manner. The disk portion 40 extends, by way of example, in radially perpendicular manner in relation to the rotation axis 35. On a common end face 46 of the disk portion 40, the transmitter 20 and the receiver 25 are arranged in axially overlapping manner. In this connection, by an "axial overlap" it is understood that in the case of a projection of at least two components in the radial direction—for instance, in the embodiment of the transmitter 20 and of the receiver 25, into a plane in which the rotation axis 35 is arranged—these components—in the embodiment, by way of example the transmitter 20 and the receiver 25—are at least partially superimposed. In the embodiment, the transmitter 20 and the receiver 25 are designed, by way of example, to be equally wide in the axial direction and, by way of example, overlap completely in the embodiment. Of course, only a partial overlap of the transmitter 20 and of the receiver 25 is also conceivable.

The transmitter 20 is arranged offset in the circumferential direction in relation to the receiver 25 with respect to the rotation axis 35. In this case, the transmitter 20 and the receiver 25 are preferentially arranged on a common circular path about the rotation axis 35. Of course, the transmitter 20 may have been arranged offset in the radial direction in relation to the receiver 25 with respect to the rotation axis 35. It is also conceivable that the transmitter 20 is arranged radially inside or radially outside in relation to the receiver 25 with respect to the rotation axis 35.

The drive motor 30 is arranged axially offset in relation to the transmitter 20 and the receiver 25. The drive motor 30 may take the form of, for instance, a brushless motor, in particular an internal rotor or even an external rotor. Alternatively, it is also conceivable that the drive motor 30 takes the form of a brushed motor. The drive motor 30 exhibits a drive rotor 49, a stator 51 and a driven shaft 53. The driven shaft 53 forms an output side 52 of the drive motor 30 and is connected to the drive rotor 49 in torque-locked manner. The driven shaft 53 is connected to the rotor 15 by means of a torque-locked connection 54. The torque-locked connection 54 may take the form of a coupling, for instance. Of course, it is also conceivable that the driven shaft 53 and the shaft portion 45 have been designed integrally and in uniform material. The drive rotor 49 can be supported so as to be capable of rotating about the rotation axis 35. The stator 51 may exhibit, for instance, a first coil and/or a permanent magnet, which during the operation of the drive motor 30 make available at least a first magnetic field. The drive rotor 49 exhibits a means 50 for making a second magnetic field available. The means 50 may exhibit, for instance, a second coil and/or a permanent magnet and/or an arrangement of coils and/or an arrangement of permanent magnets. During the operation of the drive motor 30 the means 50 and the stator 51 enter into effective linkage in known manner and make a torque available on the output side 52 of the drive motor 30. The torque serves to set the rotor 15 in rotation about the rotation axis 35.

The transmitter 20 is connected to a transmitting device 60 via a first connection 55. The receiver 25 is connected to an evaluating device 70 via a second connection 65. The transmitter 20 may exhibit, for instance, a laser diode or an LED, and the receiver 25 may exhibit a photosensitive element. Alternatively, the transmitter 20 and/or the receiver 25 may exhibit an antenna.

During the operation of the scanning device 10 the drive motor 30 has been activated, so that the rotor 15 rotates about the rotation axis 35, preferentially at a predefined constant speed. Furthermore, the transmitting device 60 controls the transmitter 20 via the first connection 55 in such a manner that the transmitter 20 emits electromagnetic radiation 75. The emitted electromagnetic radiation 75 preferentially has a frequency with a value which preferentially lies within a range from 300 MHz to 130 GHz and/or 384 THz to 789 THz. The range from 300 MHz to 130 GHz corresponds to a frequency of the electromagnetic radiation within the radar band. The range from 384 THz to 789 THz lies within a frequency band of light.

The electromagnetic radiation 75 is radiated in a direction facing away from the drive motor 30, preferentially directed into an environment 79. By virtue of the rotation of the rotor 15 about the rotation axis 35, the region of the environment 79 into which the electromagnetic radiation 75 is radiated is changed. The electromagnetic radiation 75 impinges on any object 80 that may be present. The object 80 reflects and/or scatters at least a fraction 76 of the electromagnetic radiation 75 impinging on the object 80 back in the direction of the scanning device 10.

The receiver 25 rotates together with the transmitter 20 about the rotation axis 35 and during the rotation about the rotation axis 35 is directed toward differing regions of the environment 79. The receiver 25 captures the electromagnetic radiation 76 impinging on the receiver 25 from the environment 79. The receiver 25 makes available a receiver signal, designed so as to correspond to the captured electromagnetic radiation 75, to the evaluating device 70 via the second connection 65. The evaluating device 70 evaluates the receiver signal.

By virtue of the axially overlapping arrangement of the transmitter 20 and of the receiver 25, the scanning device 10 is designed to be particularly slim in the axial direction. Furthermore, it is possible to dispense with further optical devices, in particular reflection devices such as (rotating) mirrors, prism or similar, so that the scanning device 10 is particularly simply configured. As a result, the scanning device is suitable, in particular, for capturing an environment 79 of a motor vehicle.

Figure 2:
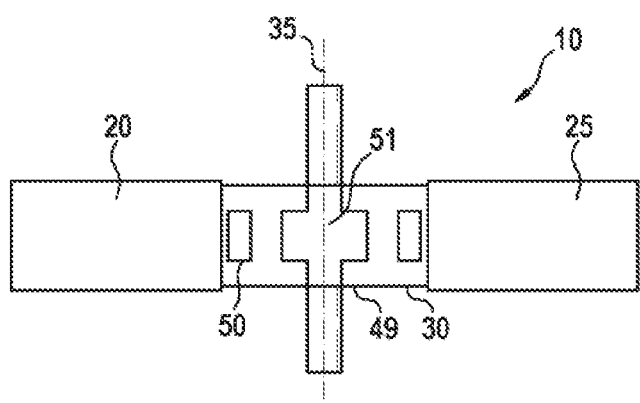
FIG. 2: a longitudinal section through a scanning device according to a second embodiment.

FIG. 2 shows a longitudinal section through a scanning device 10 according to a second embodiment. The scanning device 10 is of similar design to the scanning device 10 shown in FIG. 1. Deviating therefrom, the means, the transmitter 20 and the receiver 25 are arranged in axially overlapping manner. Furthermore, the drive motor 30 is arranged radially inside in relation to the transmitter 20 and the receiver 25. This configuration is a particularly advantage if the drive motor 30 takes the form of an external rotor instead of the configuration as an internal rotor shown in FIG. 1. As a result, in comparison with the configuration shown in FIG. 1 it is possible to dispense with the shaft portion 45 on the rotor 15, so that the rotor 15 is directly connected to the drive rotor 49 of the drive motor 30.

This configuration has the advantage that the scanning device 10 has a particularly small number of components and is of particularly compact design in the axial direction. Furthermore, a particularly low-maintenance scanning device 10 is made available.

Figure 3:
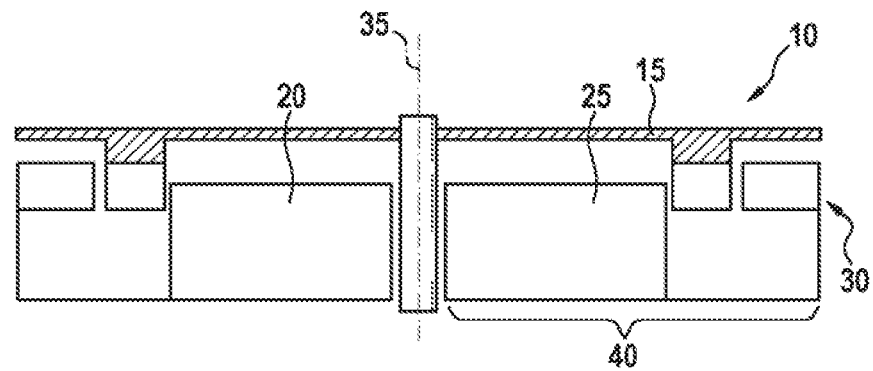
FIG. 3: a longitudinal section through a scanning device according to a third embodiment.

FIG. 3 shows a longitudinal section through a scanning device 10 according to a third embodiment. The scanning device 10 is of similar design to the scanning device 10 shown in FIG. 2. The drive motor 30 is arranged radially outside in relation to the receiver 25 and the transmitter 20. Deviating therefrom, the means 50 is arranged radially on the outside on the disk portion 40 of the rotor 15. The disk portion 40 is designed, by way of example, in the form of a pot. Radially between the transmitter 20 and/or the receiver 25 and the means 50, at least a part of the stator 51 is arranged which is arranged in axially overlapping manner with the transmitter 20, the receiver 25 and the means 50 with respect to the rotation axis 35. This configuration has the advantage that the scanning device 10 is particularly compactly configured in the axial direction.

Figure 4:
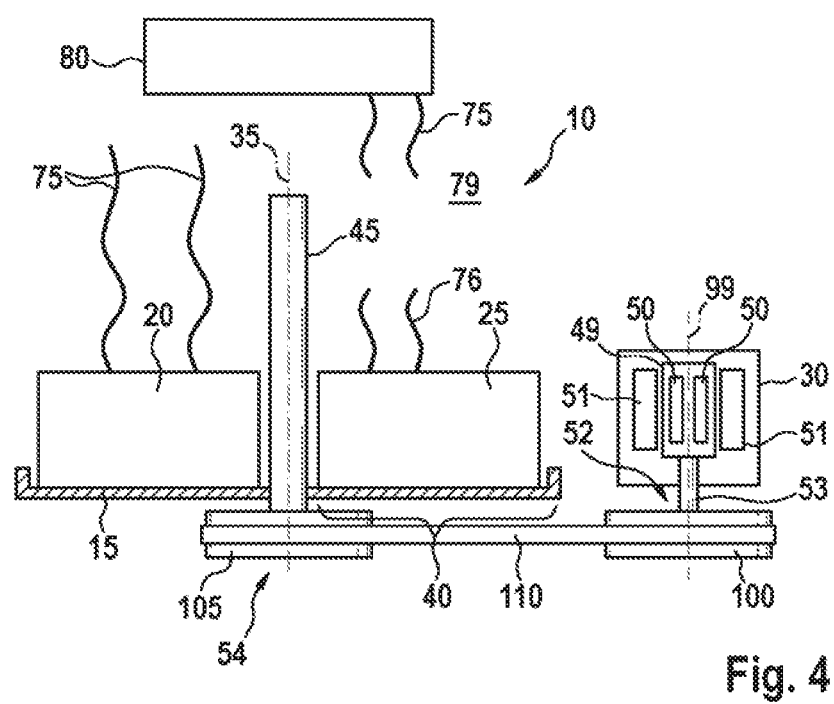
FIG. 4: a longitudinal section through a scanning device according to a fourth embodiment.

FIG. 4 shows a longitudinal section through a scanning device 10 according to a fourth embodiment. The scanning device 10 is of similar design to the scanning devices 10 shown in FIGS. 1 to 3. Deviating, the drive motor 30 is arranged eccentrically with respect to the rotation axis 35, so that the rotation axis 35 and a further rotation axis 99 are arranged axially offset in relation to one another. The drive rotor 49 of the drive motor 30 is supported so as to be capable of rotating about a further rotation axis 99. The rotation axis 35 and the further rotation axis 99 are arranged parallel to one another in the embodiment. Of course, it is also conceivable that the rotation axis 35 and the further rotation axis 99 are arranged obliquely or perpendicularly in relation to one another.

The drive motor 30, in particular the means 50, is arranged, by way of example, in axially overlapping manner in relation to the transmitter 20 and the receiver 25 with respect to the rotation axis 35. Furthermore, in the embodiment the stator 51 is arranged in completely axially overlapping manner in relation to the transmitter 20 and the receiver 25. Of course, it is also conceivable that the stator 51 is arranged only in partly overlapping manner in relation to the transmitter 20 and/or the receiver 25. As a result, the scanning device 10 has a compact configuration particularly in the axial direction.

Deviating from FIG. 1, the torque-locked connection 54 for connecting the drive motor 30 to the rotor 15 exhibits a first disk 100, coupled with the driven shaft 53 in torque-locked manner, a second disk 105 arranged with the shaft portion 45 on a side of the disk portion 40 facing away from the transmitter 20 and the receiver 25, and a coupling means 110. The coupling means 110 is connected to the first disk 100 and to the second disk 105 and couples the first disk 100 with the second disk 105 in torque-locked manner. The coupling means 110 may take the form, for instance, of a belt or a chain. In the configuration as a chain, the first disk 100 and the second disk 105 each exhibit, for instance, a appropriately designed tooth system, corresponding in each instance to the structural configuration of the coupling means 110, with which the chain engages.

Figure 5:
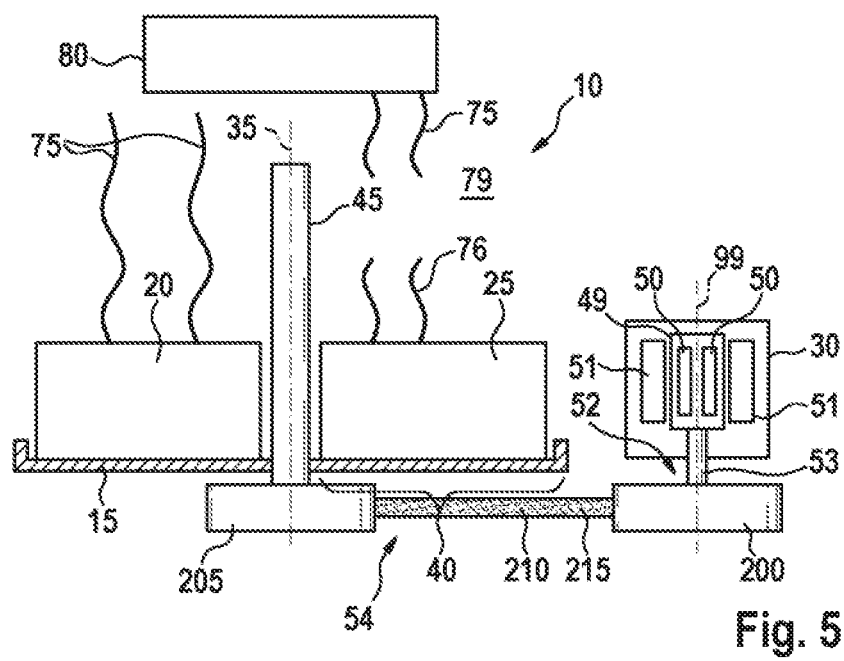
FIG. 5: a longitudinal section through a scanning device according to a fifth embodiment.

FIG. 5 shows a longitudinal section through a scanning device 10 according to a fifth embodiment. The scanning device 10 is of substantially identical design to the scanning device 10 shown in FIG. 4. Deviating therefrom, the torque-locked connection 54 is configured in deviating manner to the effect that the torque-locked connection 54 exhibits an impeller 200 instead of the first disk 100, and a turbine wheel 205 instead of the second disk 105 shown in FIG. 4. Between the impeller 200 and the turbine wheel 205 a fluidic connection 210 is provided by way of example. The fluidic connection 210 in FIG. 5 takes the form, by way of example, of a channel. Of course, it is also conceivable that the impeller 200 and the turbine 205 are arranged in a common housing, and the fluidic connection 210 is formed by the common arrangement in the housing. Furthermore, a fluid 215 is provided in the region of the fluidic connection 210, of the impeller 200 and of the turbine wheel 205. The fluid 215 is preferentially predominantly a gas or predominantly a liquid.

During the operation of the scanning device 10 the torque coming from the driven shaft 53 of the drive motor 30 is transmitted via fluid-dynamic effects, preferentially via gas-dynamic or hydrodynamic effects, between the impeller 200 and the turbine wheel 205. As a result, the impeller 200 has been coupled to the turbine wheel 205 in torque-locked manner. The fluidic coupling between the impeller 200 and the turbine wheel 205 further has the advantage that oscillations of the drive motor 30—in particular, rotary oscillations arising, for instance, in the course of the pole transition on the stator 51—are not transmitted to the rotor 15, and consequently the rotor 15 rotates about the rotation axis 35 in a manner particularly low in rotary oscillation.

Figure 6:
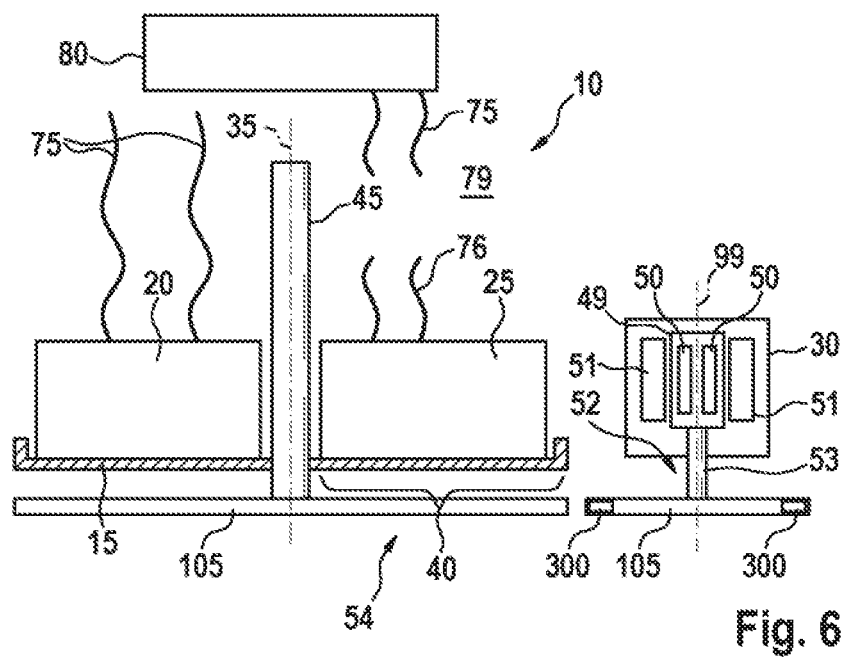
FIG. 6: a longitudinal section through a scanning device according to a sixth embodiment.

FIG. 6 shows a longitudinal section through a scanning device 10 according to a sixth embodiment. The scanning device 10 is of similar design to the configuration of the scanning device 10 shown in FIGS. 4 and 5. Deviating therefrom, the torque-locked connection 54 exhibits exclusively the first disk 100 and the second disk 105, the disks 100, 105 being arranged in axially overlapping manner in relation to the rotation axis 35 and arranged in adjoining manner in the radial direction with respect to the rotation axis 35. In the embodiment, by way of example the first disk 100 preferentially exhibits several magnets 300 arranged offset in the circumferential direction. The magnets 300 make a further magnetic field available. The second disk 105 exhibits an electrically conducting material in the embodiment.

During the operation of the scanning device 10 the torque from the output side 52 of the drive motor 30 is carried along in torque-locked manner with the first disk 100 by the generation of eddy currents by the further magnetic field of the magnets 300 in the second disk 105. By virtue of this inductive coupling of the two disks 100, 105, rotary oscillations that arise, for instance, at the pole transition in the drive motor 30 are prevented from being transmitted to the rotor 15, so that the rotor 15 rotates about the rotation axis 35 in a manner particularly low in rotary oscillation.

Figure 7:
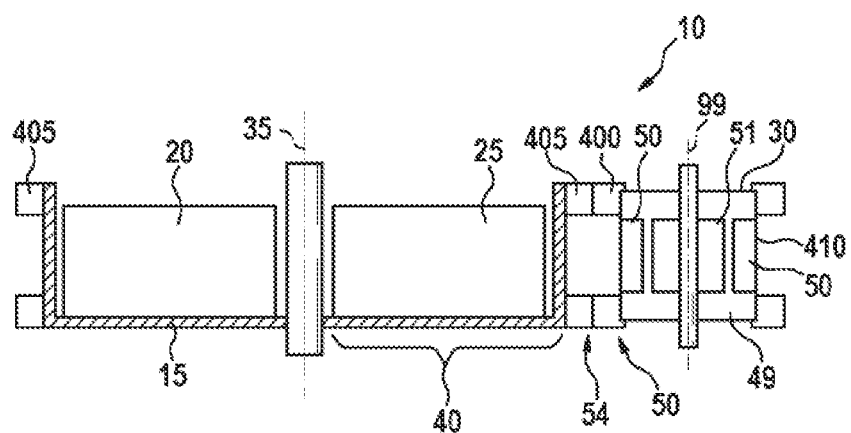
FIG. 7: a longitudinal section through a scanning device according to a seventh embodiment.

FIG. 7 shows a longitudinal section through a scanning device 10 according to a seventh embodiment. The scanning device 10 is of similar design to the configuration shown in FIGS. 4 to 6. Deviating therefrom, the torque-locked connection 54 exhibits a first tooth system 400 and a second tooth system 405. Furthermore, by way of example the drive motor 30 takes the form of an external rotor. By way of example, the first tooth system 400 is arranged on a housing 410 of the drive rotor 49 of the drive motor 30. The housing 410 is connected to the means 50. The second tooth system 405 is arranged radially on the outside on the disk portion 40 of the rotor 15. The disk portion 40 may for this purpose have been designed in the form of a pot. The first tooth system 400 engages in meshing manner with the second tooth system 405 for the transmission of torque between the housing 410 and the rotor 15. This configuration has the advantage that a possible slippage or a difference in speed between the output side 52 and the rotor 15 is avoided.

A first friction surface may have been provided instead of the first tooth system 400 described above, and a second friction surface may have been provided instead of the second tooth system 405, in which case the first friction surface bears against the second friction surface, and a frictional closure obtains between the first friction surface and the second friction surface. In this case, the first friction surface may, for instance, have been guided cylindrically around the further rotation axis 99, and the second friction surface may have been guided cylindrically around the rotation axis 35.

It should be pointed out that the features of the scanning devices 10 described in FIGS. 1 to 7 may, of course, be combined individually, or alternatively some of the features of the various scanning devices 10 may be combined with one another.

The invention claimed is:

1. A scanning device, comprising:
a transmitter configured to emit electromagnetic radiation at least intermittently;
a receiver configured to capture at least a fraction of the electromagnetic radiation that is one or more of reflected and scattered by an object;
a rotor configured to be supported so as to be rotatable about a rotation axis; and
a drive motor with at least one member configured to generate a torque, the member arranged in an at least partly axially overlapping manner in relation to one or more of the transmitter and the receiver,
wherein the transmitter and the receiver are arranged on the rotor in an at least partly axially overlapping manner with respect to the rotation axis,
wherein the member is supported so as to be rotatable about a further rotation axis, the rotor coupled with the member in a torque-locked manner by a torque-locked connection.

2. The scanning device as claimed in claim 1, wherein the transmitter, the receiver, and the member are arranged together on the rotor.

3. The scanning device as claimed in claim 1,
wherein the torque-locked connection includes a first tooth system coupled with the member, and a second tooth system coupled with the rotor,
wherein the first tooth system engages in a meshing manner with the second tooth system,
and/or
wherein the torque-locked connection includes at least one first disk coupled with the member in a torque-locked manner, and a second disk coupled with the rotor in a torque-locked manner, and a coupling member,
wherein the first disk is coupled by the coupling member with the second disk for the transmission of torque between the rotor and the member,
and/or
wherein the torque-locked connection includes an impeller coupled with the member, and a turbine wheel coupled with the rotor, wherein the impeller is coupled fluid-dynamically with the turbine wheel,
and/or wherein the torque-locked connection couples the rotor with the member inductively.

4. The scanning device as claimed in claim 3, wherein the coupling member is configured as a chain or a belt, and wherein the impeller is coupled one or more of gas-dynamically and hydrodynamically with the turbine wheel.

5. The scanning device as claimed in claim 1,, wherein the rotation axis and the further rotation axis are arranged parallel to one another.

6. The scanning device as claimed in claim 1, wherein the member includes at least one coil and/or a permanent magnet and/or an array of coils and/or an array of permanent magnets.

7. The scanning device as claimed in claim 1, wherein the electromagnetic radiation has a frequency with a value lying within one or more of a range from 300 MHz to 130 GHz and a range from 384 THz to 789 THz.

8. A scanning device, comprising:
a transmitter configured to emit electromagnetic radiation at least intermittently;
a receiver configured to capture at least a fraction of the electromagnetic radiation that is one or more of reflected and scattered by an object;
a rotor configured to be supported so as to be rotatable about a rotation axis; and
a drive motor with at least one member configured to generate a torque, the member arranged in an at least partly axially overlapping manner in relation to one or more of the transmitter and the receiver,
wherein:
the transmitter, the receiver, and the member are arranged together on the rotor,
the transmitter and the receiver are arranged on the rotor in an at least partly axially overlapping manner with respect to the rotation axis,
the drive motor includes a stator,
the stator is arranged in an at least partly axially overlapping manner in relation to one or more of the transmitter and the receiver, and
the stator is arranged, at least in some sections, radially between the member and the transmitter and/or the receiver.

9. The scanning device as claimed in claim 8, wherein the member includes at least one coil and/or a permanent magnet and/or an array of coils and/or an array of permanent magnets.

10. The scanning device as claimed in claim 8, wherein the electromagnetic radiation has a frequency with a value lying within one or more of a range from 300 MHz to 130 GHz and a range from 384 THz to 789 THz.

11. A scanning device, comprising:
a transmitter configured to emit electromagnetic radiation at least intermittently;
a receiver configured to capture at least a fraction of the electromagnetic radiation that is one or more of reflected and scattered by an object;
a rotor configured to be supported so as to be rotatable about a rotation axis; and
a drive motor with at least one member configured to generate a torque, the member arranged in an at least partly axially overlapping manner in relation to one or more of the transmitter and the receiver,
wherein the transmitter and the receiver are arranged on the rotor in an at least partly axially overlapping manner with respect to the rotation axis, and
wherein the member is arranged radially outside or radially inside in relation to one or more of the transmitter and the receiver with respect to the rotation axis.

12. The scanning device as claimed in claim 11, wherein the member includes at least one coil and/or a permanent magnet and/or an array of coils and/or an array of permanent magnets.

13. The scanning device as claimed in claim 11, wherein the electromagnetic radiation has a frequency with a value lying within one or more of a range from 300 MHz to 130 GHz and a range from 384 THz to 789 THz.

14. The scanning device as claimed in claim 11, wherein the transmitter, the receiver, and the member are arranged together on the rotor.

15. The scanning device as claimed in claim 11, wherein the transmitter, the receiver, and the member are arranged together on the rotor.

16. A scanning device, comprising:
a transmitter configured to emit electromagnetic radiation at least intermittently;
a receiver configured to capture at least a fraction of the electromagnetic radiation that is one or more of reflected and scattered by an object;
a rotor configured to be supported so as to be rotatable about a rotation axis; and a drive motor with at least one member configured to generate a torque, the member arranged in an at least partly axially overlapping manner in relation to one or more of the transmitter and the receiver, wherein the transmitter and the receiver are arranged on the rotor in an at least partly axially overlapping manner with respect to the rotation axis, wherein the transmitter is arranged radially offset in relation to the receiver and radially offset in relation to the member with respect to the rotation axis and the transmitter is arranged radially inside or radially outside in relation to the receiver with respect to the rotation axis, and wherein the transmitter is arranged offset in the circumferential direction in relation to the receiver with respect to the rotation axis and the transmitter and the receiver are arranged radially on a common circular path about the rotation axis.

17. The scanning device as claimed in claim 16, wherein the member includes at least one coil and/or a permanent magnet and/or an array of coils and/or an array of permanent magnets.

18. The scanning device as claimed in claim 16, wherein the electromagnetic radiation has a frequency with a value lying within one or more of a range from 300 MHz to 130 GHz and a range from 384 THz to 789 THz.

* * * * *